(12) United States Patent
Kerlin

(10) Patent No.: US 7,116,029 B2
(45) Date of Patent: Oct. 3, 2006

(54) AC INDUCTION MOTOR HAVING MULTIPLE POLES AND INCREASED STATOR/ROTOR GAP

(75) Inventor: Jack H. Kerlin, Provo, UT (US)

(73) Assignee: RT Patent Company, Inc., Wilmington, DE (US)

(*) Notice: Subject to any disclaimer, the term of this patent is extended or adjusted under 35 U.S.C. 154(b) by 0 days.

(21) Appl. No.: 10/894,688

(22) Filed: Jul. 19, 2004

(65) Prior Publication Data

US 2006/0012259 A1    Jan. 19, 2006

(51) Int. Cl.
*H02K 17/00* (2006.01)

(52) U.S. Cl. .................. 310/166; 310/254; 310/261

(58) Field of Classification Search ........ 310/166–168, 310/216–218, 203, 208, 254, 259–260, 261, 310/269
See application file for complete search history.

(56) References Cited

U.S. PATENT DOCUMENTS

| | | | |
|---|---|---|---|
| 2,421,301 A | 5/1947 | Swisher | |
| 2,548,633 A | 4/1951 | Stephenson | |
| 2,555,997 A | 6/1951 | Portail | |
| 3,120,633 A | 2/1964 | Genuit | |
| 3,163,792 A | 12/1964 | Sayers | |
| 3,293,460 A | 12/1966 | Iwai et al. | |
| 3,611,082 A | 10/1971 | Schmitz | |
| 3,638,098 A | 1/1972 | Guggi | |
| 3,775,652 A | 11/1973 | Bowler et al. | |
| 3,796,900 A | 3/1974 | McNab | |
| 3,798,526 A * | 3/1974 | Takahashi et al. | 318/696 |
| 3,851,234 A | 11/1974 | Hoffman et al. | |
| 3,983,463 A | 9/1976 | Nabae et al. | |
| 4,047,063 A | 9/1977 | Reece et al. | |
| 4,064,442 A | 12/1977 | Garron | |
| 4,091,294 A | 5/1978 | Zankl et al. | |
| 4,127,802 A | 11/1978 | Johnson | |
| 4,171,496 A | 10/1979 | Eriksson | |
| 4,206,374 A | 6/1980 | Goddijn | |
| 4,207,510 A | 6/1980 | Woodbury | |
| 4,538,100 A | 8/1985 | Tuten et al. | |

(Continued)

FOREIGN PATENT DOCUMENTS

DE    1 613 394 A1    4/1971

(Continued)

OTHER PUBLICATIONS

Kirschen, Daniel S. et al., "On-Line Efficiency Optimization of a Variable Frequency Induction Motor Drive", IEEE Transactions on Industry Applications, vol. 1A-21, No. 4, pp. 610-616, May/Jun. 1985.

*Primary Examiner*—Thanh Lam
(74) *Attorney, Agent, or Firm*—Jones Day

(57) ABSTRACT

There is provided an electric motor having a flat form factor. The electric motor has a rotor with a shaft attached thereto. The rotor further includes a plurality of teeth disposed thereon. The motor further includes a stator having an axial length. A plurality of teeth are disposed on the stator such that a gap is defined between the teeth of the stator and the teeth of the rotor. The motor further includes a plurality of copper windings disposed around each of the teeth of stator. Each of the windings has a length of end copper equal to about twice the axial length of the stator. In this regard, the end of the wire is greater than the width of the stator such that the form factor of the motor can be flattened.

22 Claims, 7 Drawing Sheets

U.S. PATENT DOCUMENTS

| | | | |
|---|---|---|---|
| 4,599,687 A | 7/1986 | Smith | |
| 4,600,872 A | 7/1986 | Shepard, Jr. | |
| 4,622,510 A | 11/1986 | Cap | |
| 4,628,221 A | 12/1986 | Young | |
| 4,761,576 A | 8/1988 | Savage et al. | |
| 4,772,814 A | 9/1988 | Lewus | |
| 4,831,300 A * | 5/1989 | Lindgren | 310/190 |
| 4,855,661 A | 8/1989 | Okamoto et al. | |
| 4,926,105 A | 5/1990 | Mischenko et al. | |
| 5,051,641 A | 9/1991 | Weh | |
| 5,057,763 A | 10/1991 | Torii et al. | |
| 5,206,575 A | 4/1993 | Nakamura et al. | |
| 5,239,217 A * | 8/1993 | Horst | 310/51 |
| 5,243,268 A | 9/1993 | Klatt | |
| 5,272,429 A | 12/1993 | Lipo et al. | |
| 5,281,364 A | 1/1994 | Stirling et al. | |
| 5,289,072 A | 2/1994 | Lange | |
| 5,306,996 A | 4/1994 | Yang | |
| 5,386,162 A * | 1/1995 | Horst | 310/51 |
| 5,450,305 A | 9/1995 | Boys et al. | |
| 5,481,168 A | 1/1996 | Mutoh et al. | |
| 5,506,492 A | 4/1996 | Harris | |
| 5,689,164 A | 11/1997 | Hoft et al. | |
| 5,757,164 A | 5/1998 | Yoshizaki et al. | |
| 5,866,967 A | 2/1999 | Sasaki | |
| 5,902,506 A | 5/1999 | Scott et al. | |
| 5,940,286 A | 8/1999 | Harmoinen et al. | |
| 6,093,987 A | 7/2000 | Bukoschek et al. | |
| 6,124,697 A | 9/2000 | Wilkerson | |
| 6,268,678 B1 | 7/2001 | Asao et al. | |
| 6,307,345 B1 | 10/2001 | Lewis | |
| 6,343,021 B1 | 1/2002 | Williamson | |
| 6,384,564 B1 | 5/2002 | Pollock | |
| 6,392,376 B1 | 5/2002 | Kobayashi et al. | |
| 6,417,598 B1 | 7/2002 | Grehant | |
| 6,541,943 B1 | 4/2003 | Wylie et al. | |
| 6,690,139 B1 | 2/2004 | Seibel | |
| 6,777,906 B1 | 8/2004 | Kinpara et al. | |
| 6,809,492 B1 | 10/2004 | Harakawa et al. | |
| 6,815,925 B1 | 11/2004 | Chen et al. | |
| 6,952,068 B1 | 10/2005 | Gieras et al. | |
| 2002/0171315 A1 | 11/2002 | Kastinger | |
| 2004/0239190 A1* | 12/2004 | Rau et al. | 310/10 |
| 2004/0263012 A1 | 12/2004 | Dommsch et al. | |

FOREIGN PATENT DOCUMENTS

| | | |
|---|---|---|
| DE | 21 17 213 A1 | 10/1972 |
| DE | 3645016 | 9/1988 |
| EP | 1 164 684 A | 12/2001 |
| GB | 1309034 | 3/1973 |
| GB | 1468155 | 3/1977 |
| JP | 7245163 | 9/1995 |
| WO | 2003/085802 | 10/2003 |

* cited by examiner $B_S$ = STATOR FIELD
$B_R$ = ROTOR FIELD
$I_g$ = ROTOR-STATOR GAP LENGTH
$\theta_E$ = ELECTRICAL ANGLE BETWEEN $B_S$ AND $B_R$
$r$ = GAP RADIUS $r_g$ = ROTOR-STATOR GAP RADIUS $r_g$ = ROTOR-STATOR GAP RADIUS $h$ = AXIAL LENGTH

AC INDUCTION MOTOR HAVING MULTIPLE POLES AND INCREASED STATOR/ROTOR GAP

BACKGROUND OF THE INVENTION

1. Field of Invention

The present application generally relates to AC induction motors and more specifically to an AC induction motor having increased torque output by increasing the number of poles and increasing the gap between the stator and rotor.

2. Status of the Prior Art

The theory of motor operation can be developed based on the equivalency of electric-to-magnetic-to-mechanical energy exchange. The theory encompasses both the Lorentz Force Equation and the equation for attractive forces. The Lorentz Force Equation is usually invoked for evaluating AC machine performance while the equation for attractive forces evaluates reluctance motor analysis.

The universal law used to explain the operation of an electromotive machine is simply stated as the equivalence of the change in stored magnetic energy $dE_{magnetic}$ with the change in mechanical shaft energy $dE_{mechanical}$:

$$dE_{magnetic} = dE_{mechanical} \quad \text{Eq. 1}$$

where:

$E_{magnetic}$ = magnetic energy stored inside the machine (co-energy); and $E_{mechanical}$ = mechanical energy produced by the machine (shaft energy).

Magnetic energy exists within a magnetic field because the field requires energy for its formation in the first place. The magnetic field represents the exact amount of energy that was expended for its creation.

The most effective method of storing magnetic energy is with an electromagnetic device known as an inductor. The inductor consists of a coil of n turns surrounding an iron core serving as the magnetic circuit for conducting magnetic flux. The iron core presents low resistance or low reluctance R, to the flow of flux and therefore the core itself contains very little magnetic energy. Consequently, additional reluctance must be added to the magnetic circuit in the form of an air gap in order to increase the energy storage capacitor of the inductor. A relatively small air gap can raise the overall circuit reluctance R by more than ten times. Or in other words, the small gap typically contains over ten times the magnetic energy of the iron core which simply provides the flux conduit for channeling flux through the coil and concentrating flux at the gap.

Additionally, in order to increase the torque of an electric motor, the number of poles can be increased with the penalty of added weight to the motor for a given shape. Furthermore, the addition of poles also decreases the efficiency of the motor. For example, heat dissipation varies as the square of torque. Accordingly, by doubling the torque by adding additional poles, the heat increase will be four-fold.

SUMMARY OF THE INVENTION

There is provided an electric motor having a flat form factor. The electric motor has a rotor with a shaft attached thereto. The rotor further includes a plurality of teeth disposed thereon. The motor further includes a stator having an axial length. A plurality of teeth are disposed on the stator such that a gap is defined between the teeth of the stator and the teeth of the rotor. The motor further includes a plurality of copper windings disposed around each of the teeth of stator. Each of the windings has a length of end copper equal to about twice the axial length of the stator. In this regard, the end copper of the coil is greater than the width of the stator. Accordingly, the form of the stator and hence the motor can be flattened.

The windings can be configured for three phases such that there are thirty-six stator teeth to form twelve poles. Furthermore, the gap between the stator and rotor is configured to increase the magnetic reluctance of the circuit thereby increasing the torque. Alternatively, the motor can be operated in partial saturation in order to increase motor torque.

Additionally, there is provided a method of making an electric motor with increased torque. The method comprises providing a rotor having a plurality of rotor teeth and a shaft. A stator is provided that has a plurality of stator teeth. The stator is configured to circumferentially surround the rotor. A gap is defined between the rotor teeth and the stator teeth. A wire coil is wrapped around the stator teeth such that a length of the end copper for the wire coil is about two times greater than the width of the stator.

A method of generating increased torque from an electric motor having a rotor, a stator, at least one stator tooth and a wire coil comprises wrapping the wire coil around the stator tooth such that a length of the end copper for the wire coil exceeds the width of the stator. In this respect, the length of the end copper for the wire coil is about two times greater than the width of the stator.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
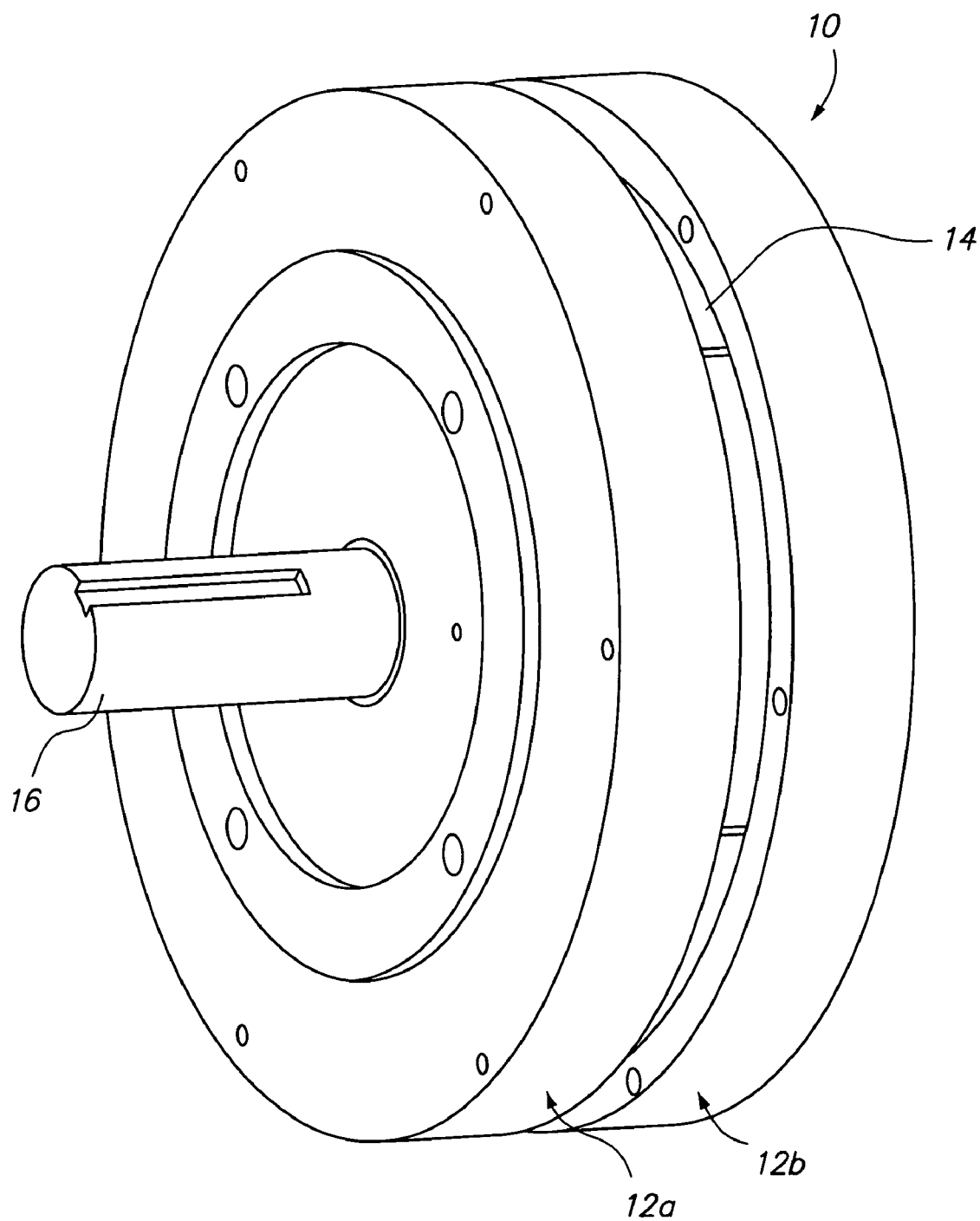
FIG. 1 is a perspective view of a motor with a flat form factor.
Figure 2:
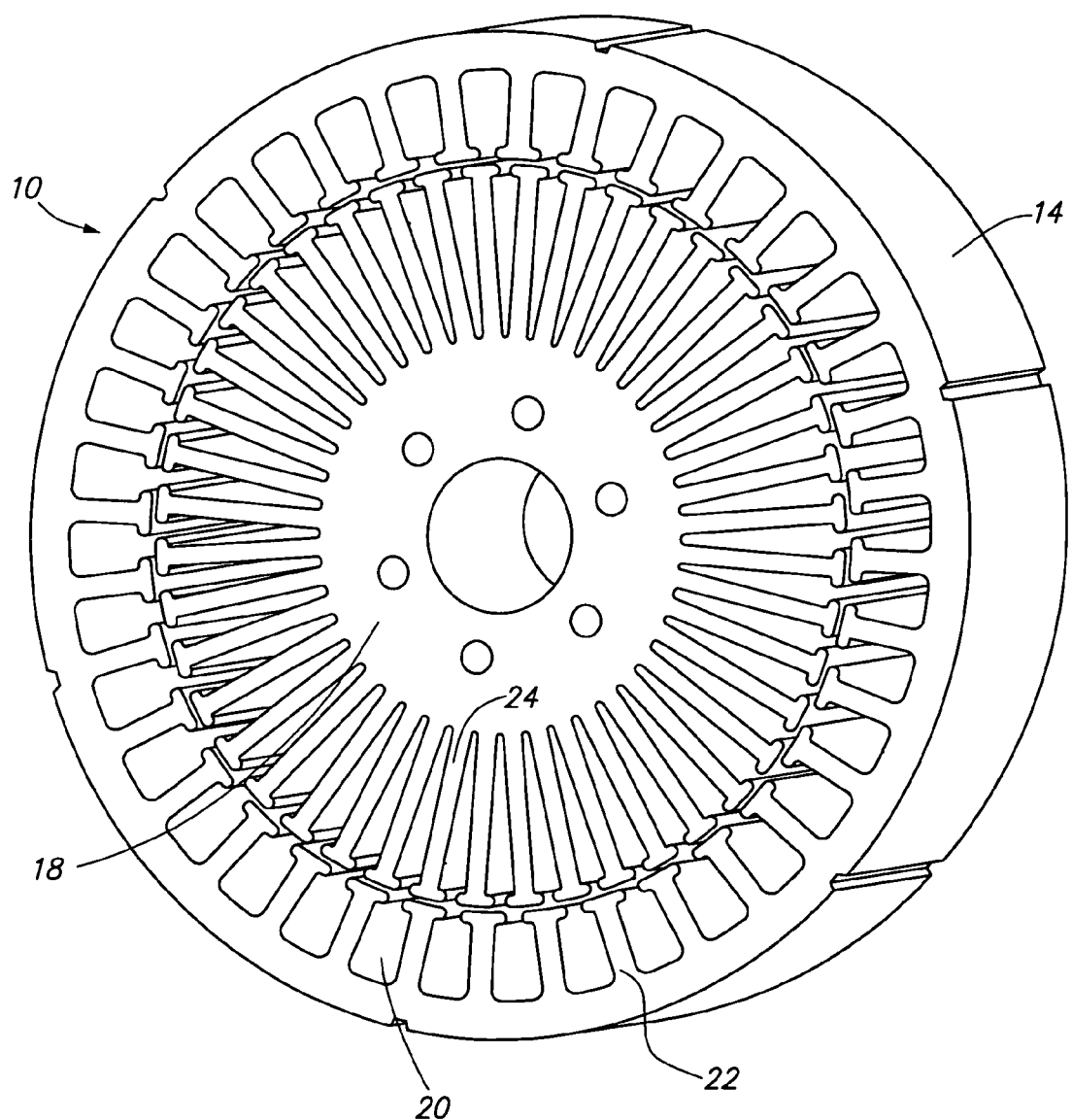
FIG. 2 is a perspective view of the stator and rotor for the motor shown in FIG. 1.

Referring now to the drawings wherein the showings are for purposes of illustrating preferred embodiments of the present invention only, and not for purposes of limiting the same, FIG. 1 is a perspective view of a multiple-pole, flat form factor motor 10. The motor 10 has two circular end bells 12a, 12b supporting a circular stator core 14. As will be further explained below, the stator core 14 is formed from a metallic material such as iron and contains multiple teeth surrounded by wire windings. A shaft 16 extends from the motor 10 and is attached to a rotor 18, as seen in FIG. 2. The rotor 18 is generally circular and is sized to be inserted within the stator core 14. The rotor 18 has multiple teeth 24 disposed around the circumference thereof. Each of the teeth 24 is surrounded by a wire winding. Similarly, the stator core 14 has multiple winding slots 20 and teeth 22 disposed around an interior circumference. Each of the stator teeth 22 is surrounded by a wire winding. In this respect, the motor of FIG. 1 shows a non-salient pole AC motor.

Figure 3:
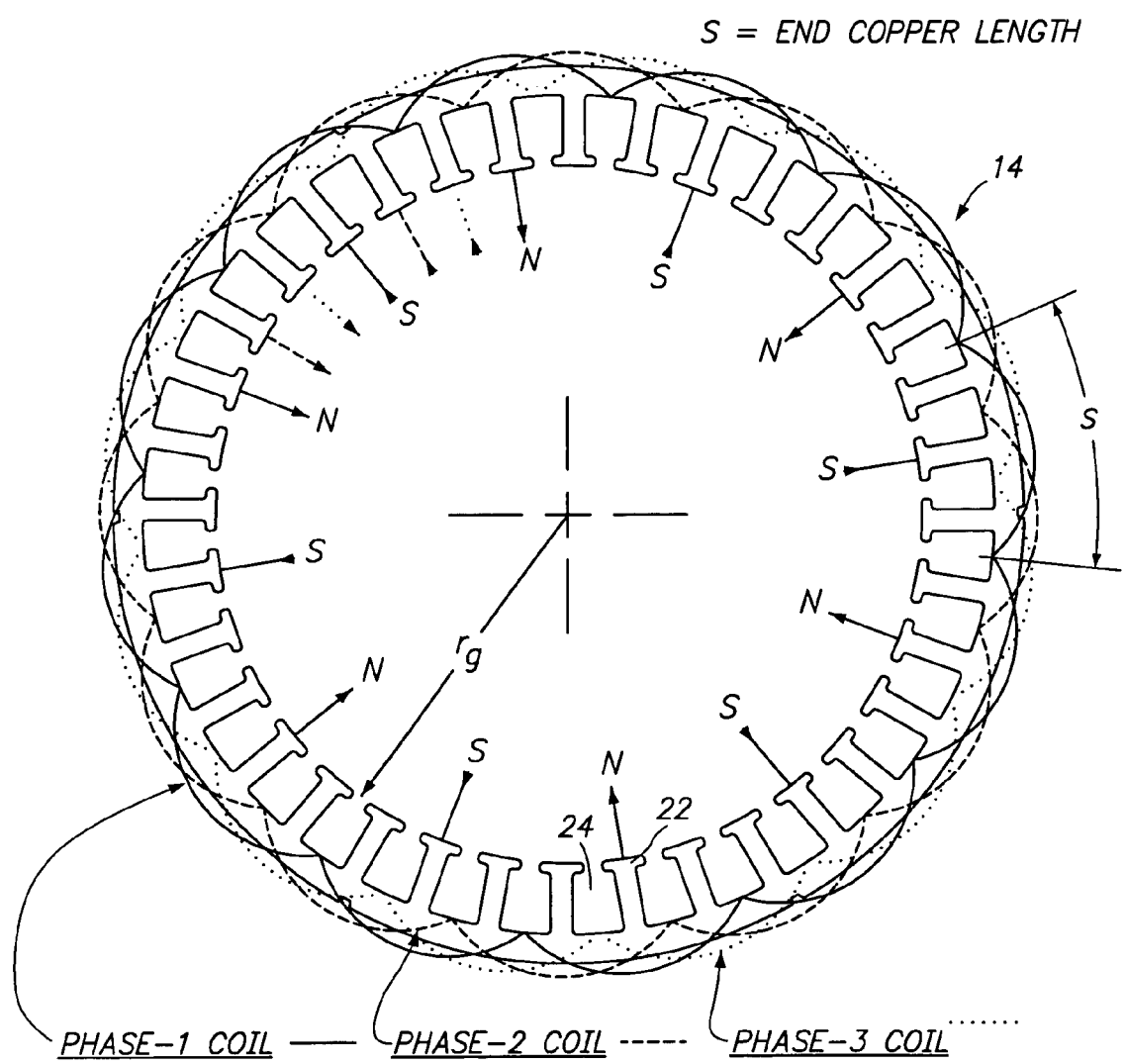
FIG. 3 is a diagram illustrating the winding pattern for the stator shown in FIG. 2.

Referring to FIG. 3, an end view of the stator core 14 with a 3-phase winding threading the stator winding slots 20 to form a 12-pole motor is shown. In the example shown in FIG. 3, there are thirty-six stator teeth to form thirty-six stator winding slots 20. Each pole of the motor occupies two slots 20 with two poles sharing the same slot 20. Thus, on the average, there is one coil per slot such that the 3-phase, 12 pole format requires a minimum stator slot count of 1×3×12=36 slots. Higher slot counts for a 3-phase, 12-pole machine would be integer multiples of 36 such as 72 or 108 slots. It will be recognized by those of ordinary skill in the art that other configurations of the teeth and slots to form multiple pole motors are possible.

In a "smooth bore" format, the poles are typically formed magnetically by the windings. Only in a reluctance type machine are poles created mechanically by protrusions of the iron core which are termed "salient" poles. The particular slot count shown in FIG. 3 could accommodate other pole numbers such as a 6-pole machine with two coils per slot (2×3×6=36) or a 4-pole machine with three coils per slot (3×3×4=36).

The motor of FIG. 1 permits torque multiplication by means of a high pole number without incurring any resistive losses attendant to motors of conventional axial form-factor. As the pole number increases, the aspect ratio (i.e., form factor) of the motor 10 becomes flattened wherein the motor diameter exceeds axial length. Torque generation is analyzed for an ideal mathematical model where rotor and stator currents are held constant. Furthermore, the motor is defined as having zero losses such that ohmic, hysteresis, eddy current, bearing windage and other parasitic losses are omitted in the calculations. Furthermore, the iron core of the motor 10 is considered to have infinite permeability with all magnetic circuit reluctance residing in the rotor-stator air gap.

A shaft rotating through an angle against torque (motor case) will expend energy proportional to the electric energy consumed during the time interval under consideration. Conversion of electric energy to mechanical energy goes through an intermediate step involving magnetic energy. This is the critical link between electrical energy input and mechanical energy output. It is only reasonable to suppose there should be a quantity of magnetic energy $\Delta E_M$ corresponding to both the electrical energy input and mechanical energy output.

Basic electromagnetic theory shows the magnetic energy of an ideal inductor is entirely stored in a gap intentionally interposed in the magnetic circuit when core permeability is assumed infinite. Where there is no gap there is no stored magnetic energy and the system is not identified as an inductor. For instance, an ideal transformer (no gap, infinite permeability) is not an inductor and requires no magnetizing current. The presence of magnetizing current and magnetic energy in any electromagnetic-mechanical system implies properties of an inductor. Any device which utilizes magnetic energy for conversion of electrical to mechanical energy must be modeled as an inductor with provision for storage of magnetic energy, which in the case of an ideal inductor, is stored only in the gap.

Assume that there is a quantity of magnetic energy $\Delta E_M$ equivalent to the quantity of mechanical work (shaft energy) $\Delta E_S$. If the resulting torque equation is identical to the recognized Lorentz expression, which forms the foundation of conventional motor analysis, then this assumption has been proven correct.

Pole coil current i will be held constant in order to eliminate the effect of varying current di which creates only reactive energy. Under this condition, any change in B is solely due to shaft rotation and therefore relates directly and entirely to shaft work.

All expressions are represented on a per-pole basis unless otherwise noted. When total machine parameters and performance are given, they will be identified with the subscript "$_{TOT}$".

Figure 4:
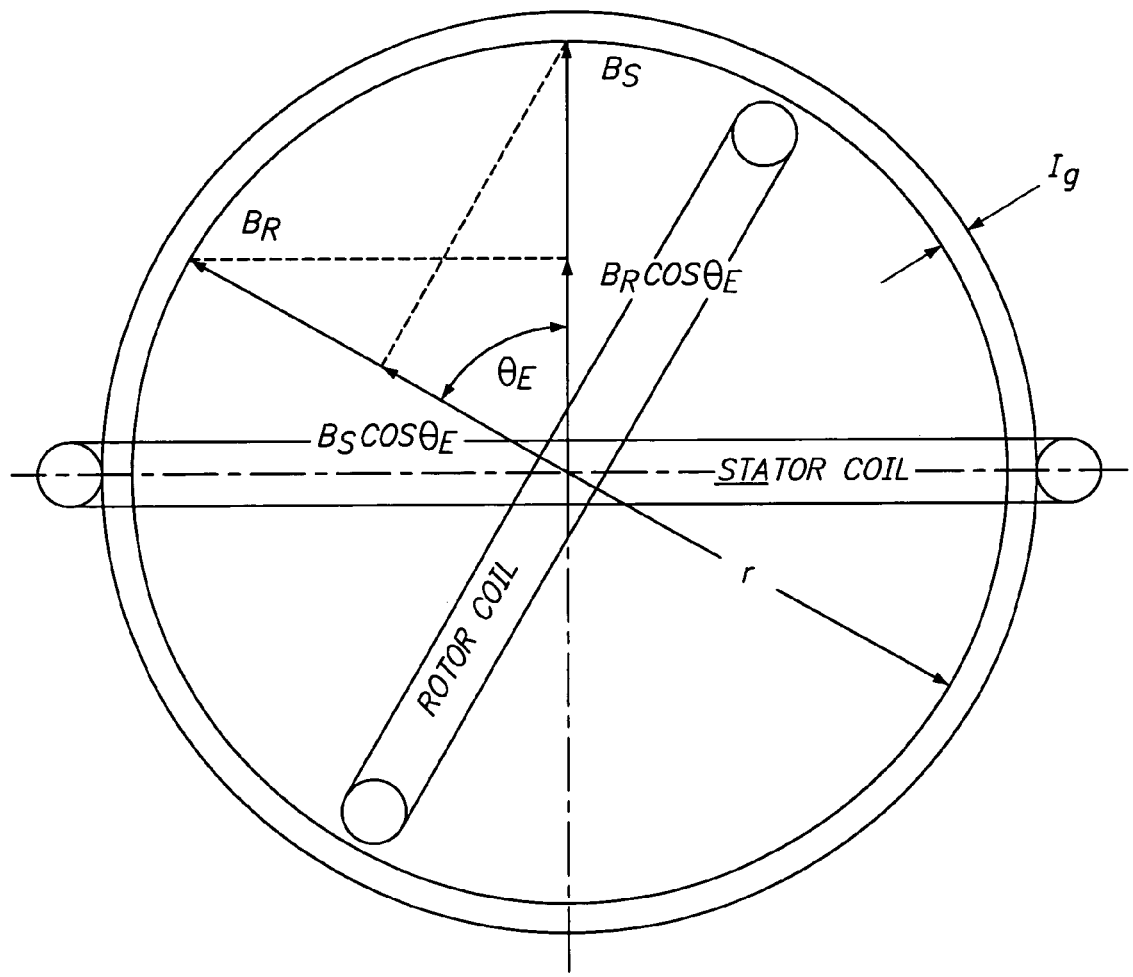
FIG. 4 is a diagram illustrating magnetic and electric fields for the motor shown in FIG. 1.
Figure 5:
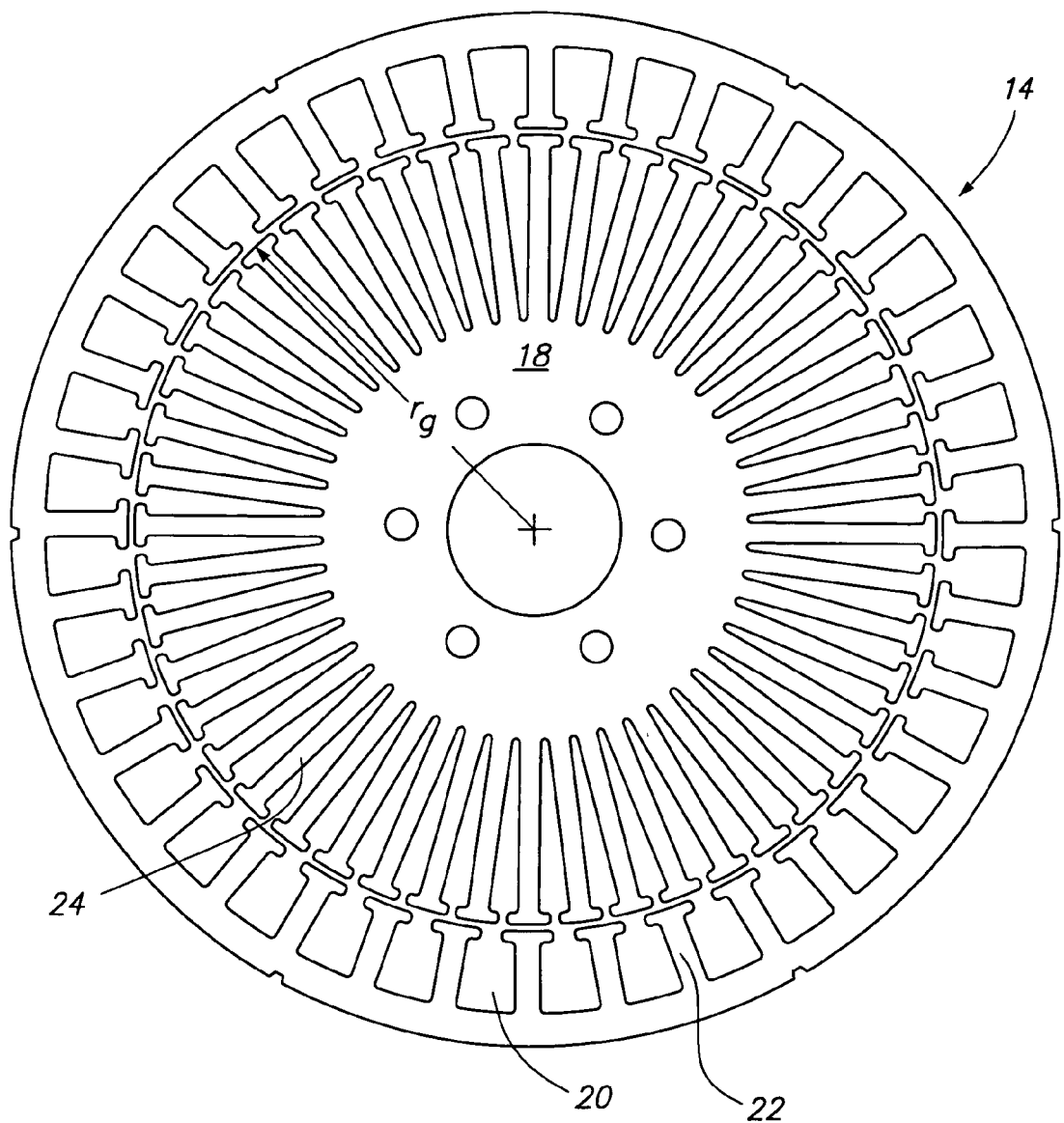
FIG. 5 is an end view of the stator and rotor shown in FIG. 2.
Figure 6:
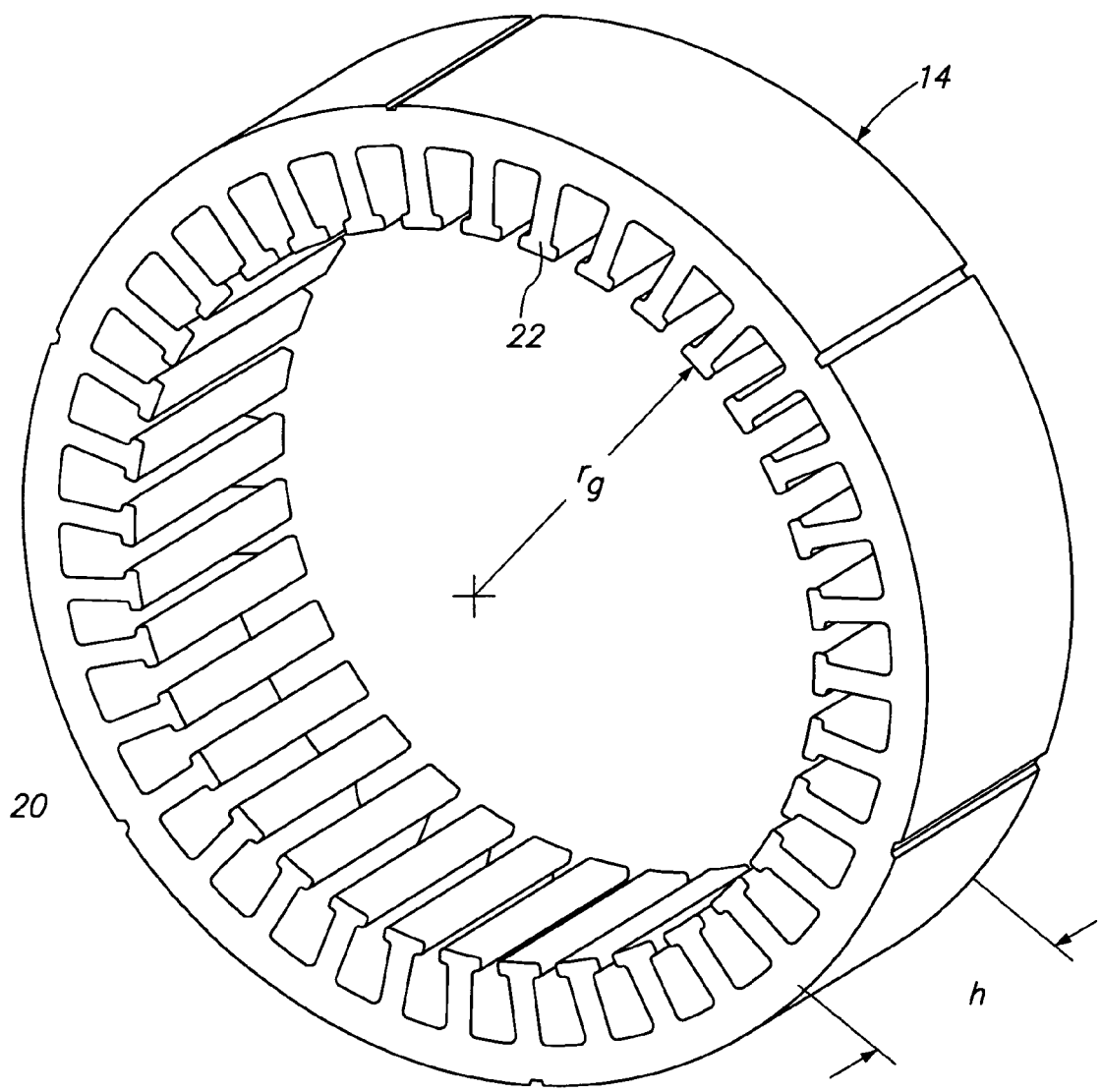
FIG. 6 is a perspective view of the stator shown in FIG. 5.

Referring to FIG. 4, a simplistic AC motor is shown with an excited rotor and stator. The motor consists of a coil for the stator and a coil for the rotor, interacting through a common gap. To simplify analysis, both coils are assumed to encompass the same core area A. Magnetic fields for both the stator and rotor are each identified separately in order to show effects of disparate flux densities in the rotor and stator. In every other respect, both coils are identical electromagnetically and are recognizable only in terms of their motion.

Torque analysis will consider only toque developed in the rotor. The manner in which the stator field exists is irrelevant to the discussion and independent of the results. Therefore, denoting rotor properties with the subscript R will be omitted as understood in except to identify rotor and stator fields.

Assume the total change in the magnetic energy stored in the pole gap of a single pole is equivalent to the change in mechanical energy (shaft work) produced by a single rotor (or stator) pole, so that:

$$dE_{Mp} = dE_{Sp} \qquad \text{Eq. 2}$$

where: $dE_{Mp}$=change in the total magnetic energy of a single rotor pole; and
$dE_{Sp}$=change in the mechanical (shaft) energy of a single rotor pole.

Note: subscripts p and g will designate "per pole" and "gap" location.

The instantaneous magnetic energy of a single rotor pole is:

$$E_{Mp} = \tfrac{1}{2} i_p^2 L_p \qquad \text{Eq. 3}$$

where: $E_{Mp}$=instantaneous magnetic energy of a single rotor pole;
$i_p$=rotor pole coil current, and is held constant; and
$L_p$=inductance per rotor pole.

Differentiating Eq. 3 with the current held constant:

$$dE_{Mp} = \tfrac{1}{2} i_p^2 dL_p \text{ (rotor pole energy)} \qquad \text{Eq. 4}$$

Expressing pole inductance $L_p$ in terms of its fundamental definition:

$$L_p = \left(\frac{n}{i_p}\right)\phi_{pg} \qquad \text{Eq. 5}$$

where: $\phi_{pg}$=the total flux contained in the gap of one rotor pole including contribution of the stator field, as shown later; and
n=number of coil turns per pole.

Differentiating Eq. 5 at constant current i:

$$dL_p = \left(\frac{n}{i_p}\right)d\phi_{pg} \qquad \text{Eq. 6}$$

Inserting Eq. 5 into Eq. 4:

$$dE_{Mp} = 1/2 i_p^2 \left(\frac{n}{i_p}\right) d\phi_{pg} = 1/2 (ni)_p d\phi_{pg} \qquad \text{Eq. 7}$$

where: $(Ni)_p$=amp-turns per pole.
From Eq. 2, let differential shaft work be defined as:

$$dE_{Mp} = dE_{Sp} = T_p d\theta_s \qquad \text{Eq. 8}$$

where: $\theta_S$=the rotational angle of the shaft as shown in FIG. 4.
Substituting Eq. 8 into Eq. 7:

$$T_p = 1/2 (ni)_p \frac{d\phi_{pg}}{d\theta_S} \qquad \text{Eq. 9}$$

where: $(ni)_p$=amp-turns per rotor pole.
Let rotor flux $\phi_p$ be defined as:

$$\phi_p = A_{pg} B_{Rg} \qquad \text{Eq. 10}$$

where: $A_{pg}$=pole area at the gap; and
$B_{Rg}$=instantaneous rotor flux density in the gap, a function of shaft position.
Differentiating Eq. 10:

$$d\phi_p = A_{pg} dB_{Rg} \qquad \text{Eq. 11}$$

Substituting Eq. 11 into Eq. 9:

$$T_p = 1/2 (ni)_p A_{pg} \left(\frac{dB_{Rg}}{d\theta_S}\right) \text{ (torque per pole)} \qquad \text{Eq. 12}$$

Cursory examination of these torque equations (equations. 9 and 12) can lead to the mistaken conclusion that overall machine torque is independent of the number of poles employed in a motor. Because $A_{pg}$ decreases with increasing pole number, it appears that there is no net gain obtained by the addition of poles.

However, it will be shown that $(dB_{Rg}/d\theta_S)$ varies with pole number at a rate that is inversely proportional to pole gap area $A_{pg}$. These two effects cancel one another so that the number of poles has no effect on the torque per pole as given by Eq. 12. Torque per pole is independent of the total number of poles enabling entire machine torque to rise with the addition of poles, which will be demonstrated next:

Let the pole gap area be given as:

$$A_{pg} = \frac{\text{(gap circumference times axial length)}}{N_p} = \frac{(2\pi r)h}{N_p} \qquad \text{Eq. 13}$$

where: $N_p$=total number of poles in the machine
r=rotor-stator gap radius; and
h=rotor axial length.
Let $B_{Rg}$, the rotor flux density in the gap, be given as:

$$B_{Rg} = [B'_{Rg} + B'_{Sg} \cos \theta_E] \text{ (instantaneous rotor flux density)} \qquad \text{Eq. 14}$$

where: $B'_{Sg}$=fixed stator flux density in the gap.
Prime marks (') indicate the fixed value of $B'_{Rg}$ and $B'_{Sg}$ as generated by the rotor and stator constant currents. The additional term $B'_{Sg} \cos \theta_E$ is the vector component of the stator field penetrating the rotor coil.

Angle $\theta_E$ is the electrical angle, rather than the mechanical angle, according to which $B_{Rg}$ varies in sinusoidal synchronization with the mechanical shaft coil angle $\theta_S$. It is the electrical angle $\theta_E$ that corresponds to variation of $B_{Rg}$, as a function of shaft rotation because, regardless of how many poles may be incorporated, a complete torque cycle always fits within half an electrical cycle. A "torque cycle" is defined as the sinusoidal variation of torque beginning at zero, rising to a peak and returning to zero in a sinusoidal fashion. In a 2-pole machine, these two angles $\theta_E$ and $\theta_S$ are of equal value. Their relationship may be shown as:

$$\theta_E = \left(\frac{N_p}{2}\right) \theta_S \qquad \text{Eq. 15}$$

Inserting Eq. 15 into Eq. 14:

$$B_{Rg} = \left[B'_{Rg} + B'_{Sg} \cos \frac{N_p}{2} \theta_S\right] \qquad \text{Eq. 16}$$

Differentiating Eq. 16 and using Eq. 15:

$$\frac{dB_{Rg}}{d\theta_S} = \frac{N_p}{2} B'_{Sg} \sin \frac{N_p}{2} \theta_S = \frac{N_p}{2} B'_{Sg} \sin \theta_E \qquad \text{Eq. 17}$$

Substituting Eq. 17 into Eq. 12:

$$T_p = 1/2 (ni)_p A_{pg} \left(\frac{N_p}{2}\right) B'_{Sg} \sin \theta_E \qquad \text{Eq. 18}$$

Substituting Eq. 13 into Eq. 18:

$$T_p = 1/2 (ni)_p \frac{2\pi r h}{N_p} \left(\frac{N_p}{2}\right) B'_{Sg} \sin \theta_E = \frac{1}{2} (ni)_p \pi r h B'_{Sg} \sin \theta_E \qquad \text{Eq. 19}$$

Because the total flux in the pole gap is equal to the total flux inside the pole coil, then let:

$$\pi r B'_{Sg} = 2r B'_{Sc} \qquad \text{Eq. 20}$$

where: $B'_{Sc}$=flux density within the stator coil rather than the gap.
Solving Eq. 20 for $B'_{Sg}$:

$$B'_{Sg} = \frac{2}{\pi} B'_{Sc} \qquad \text{Eq. 21}$$

Substituting Eq. 21 into Eq. 19:

$$T_p = \frac{1}{2} (ni)_p \pi r h \left(\frac{2}{\pi}\right) B'_{Sc} \sin \theta_E = (ni)_p h r B'_{Sc} \sin \theta_E \qquad \text{Eq. 22}$$

Rearranging terms in Eq. 22 with an electrical torque angle $\theta_E$ so that ($\sin \theta_E = 1$):

$$T_p = r[(ni)_p h B'_{Sc}] \qquad \text{Eq. 23}$$

Note that Eq. 23 is the familiar Lorentz equation applied to one pole or conductor. It is universally applicable to every type of machine producing force or torque electromagnetically.

Even more fundamental is the derivation of the Lorentz force from Eq. 23 by using the definition of torque as $T_p = rF_p$. Then from Eq. 23:

$$F_p = (ni)_p h B'_{Sc} \text{ (Lorentz force equation)} \quad \text{Eq. 24}$$

where: $F_p$ = force normal to $B'_{Sc}$ produced by one pole.

Note: Eq. 24 is the Lorentz equation for normal force $F_p$ developed on conductor of length h carrying total current $(ni)_p$ immersed in a stator magnetic field of flux density $B_{Sc}$.

A real machine cannot have less than two poles. Therefore the actual torque of a 2-pole machine is twice that of Eq. 23 since the total conductor loop length=2h.

The initial assumption has now been verified that the change in magnetic energy $dE_{Mp}$ is exactly equal to the change in mechanical energy $dE_{Sp}$ as expressed in Eq. 2. The direct correspondence of Eq. 2 with Eq. 24 confirms the equality of magnetic and mechanical energy.

The possibility that magnetic energy $dE_{Mp}$ may be simply reactive and out-of-phase with shaft energy $dE_{Sp}$ is prohibited by Eq. 2 which indicates both energies manifest simultaneously and in-phase.

Also, the stipulation of constant current is given to eliminate reactive energy which can be shown as appearing only in conjunction with time-varying current. Where varying current exists, reactive energy will unavoidably appear in actual machines that are fundamentally AC in nature and posses magnetic energy storage properties.

In short, the machine show in FIG. 4 with constant current contains only magnetic real energy in-phase with mechanical energy. An actual machine with sinusoidal current will contain both reactive and true magnetic energies, the former due to time-varying current; the latter due to production of mechanical energy.

Generally, from Eq. 18:

$$T_{TOT} = N_p T_p = \frac{1}{2} N_p (ni)_p \pi r h B'_{Sg} \sin \theta_E \quad \text{Eq. 25}$$

Confusion has understandably arisen over the role of poles for reasons discussed following Eq. 12, inasmuch as the general equation for torque per pole is often presented without clear definition as:

$$T_P = \frac{1}{2}(ni)\frac{d\phi_P}{d\theta} \quad \text{Eq. 26}$$

which corresponds to Eq. 9. It's easy to reach a false conclusion at first glance because "obviously" the flux per pole $\phi_P$ decreases as more poles are added so therefore nothing is gained by adding more poles. In fact the flux per pole does decrease with increasing poles but this is exactly offset by a proportional increase in the rate of change of flux due to the distinction between electrical (magnetic field) angle $\theta_E$ and shaft angle $\theta_S$ as given by Eq. 15. For instance, a 4-pole motor has twice the electrical angle relative to shaft angle as a 2-pole motor.

In terms of absolute pole magnetic energy, higher poles do indeed encompass less flux and therefore less magnetic energy than do fewer poles. The shaft angle required to traverse a pole decreases with higher pole numbers and thus less gap magnetic energy is available for conversion to mechanical energy, according to Heisenberg's Equi-Partition of Energy.

However, less energy does not translate to less torque. The initial assumption of Eq. 2 applies only to the equivalence of magnetic and mechanical energy where mechanical energy is torque multiplied by the shaft angle, not electrical angle.

This can be shown by multiplying both sides of Eq. 19 or Eq. 22 by $d\theta_S$ to give:

$$dE_{Mp} = T_p d\theta_S = \frac{1}{2}(ni)_p \pi r h B'_{Sg} \sin \theta_E d\theta_S \quad \text{Eq. 27}$$

With increasing poles, the shaft angle decreases in traversing a torque cycle so that $dE_{Mp}$ decreases per torque cycle. Substituting Eq. 15 into Eq. 27 clarifies this point:

$$dE_{Mp} = T_p d\theta_S = \frac{1}{2}\left(\frac{2}{N_p}\right)(ni)_p \pi r h B'_{Sg} \sin \theta_E d\theta_E \quad \text{Eq. 28}$$

Clearly, while traversing one torque cycle (half an electrical cycle, $\theta_E$), the magnetic energy per pole $dE_{Mp}$ decreases as pole number $N_p$ increases. But, while the pole energy $dE_{Mp}$ decreases, pole torque $T_p$ remains constant irrespective of pole number. In other words, even though the change in shaft angle $d\theta_S$ per torque cycle decreases as pole number increases, the resulting decrease in $dE_{Mp}$ is due solely to the decrease in shaft angle $d\theta_S$, not a decrease in pole torque $T_p$. Thus pole torque $T_p$ is constant independent of the number of poles $N_p$.

It has been shown that the number of poles $N_p$ directly determines the potential for torque development. However, adding poles in order to increase torque, for a given motor shape, severely increases resistive losses and results in reduced efficiency. Only by changing motor shape can this pole efficiency penalty be circumvented.

As mentioned above, the other fundamental element in torque production is the quantity of magnetic energy stored in the machine. Most of the stored magnetic energy resides in the rotor-stator air gap. This energy $E_{mag}$ is therefore proportional to gap volume $v_{vol}$ and the square of gap flux density $B_{gap}^2$. Thus both flux density $B_{gap}$ and gap volume $v_{gap}$ must be held constant when poles are added to achieve the maximum gain in torque with increasing poles.

Stored magnetic energy may be expressed as:

$$E_{mag} = k v_{gap} B_{gap}^2 \quad \text{Eq. 29}$$

where: k is constant multiplier.

Gap volume $v_{gap}$ for a given machine size is proportional to the radial gap length $l_{gap}$ so that Eq. 29 may be written as:

$$E_{mag} = k l_{gap} B_{gap}^2 \quad \text{Eq. 30}$$

According to Eq. 30, both flux density $B_{gap}$ and gap length $l_{gap}$ must be held constant as pole number increases in order to achieve the full benefit of torque enhancement due to pole increase alone.

Pole coil amp-turns Ni is directly related to $B_{gap}$ and $l_{gap}$ as shown by Eq. 31:

$$Ni = k B_{gap} l_{gap} \quad \text{Eq. 31}$$

Notice that pole cross-sectional area is entirely absent from Eq. 31. The total axial area available for containing both the coil copper and tooth iron of a single pole decreases as the number of poles rises for a given weight and shape machine. Yet, according to Eq. 31, amp-turns Ni must be held constant to maintain flux density $B_{gap}$. Current density $J=Ni/A_{copper}$ must also be held constant to avoid increasing heat generation per pole which means the portion of pole area $A_{copper}$ occupied by copper must remain constant. Consequently the remaining portion of available pole space occupied tooth iron $A_{tooth\ width}$ must decrease with increasing poles. As tooth iron $A_{tooth\ width}$ decreases, gap flux density $B_{gap}$ decreases as well, because:

$$B_{gap} = \left(\frac{A_{tooth\ width}}{A_{tooth\ face}}\right) B_{tooth\ saturation} \qquad \text{Eq. 32}$$

where: $A_{tooth\ face}$=the flanged (tang) portion of the tooth, overlapping the copper slot, from which gap flux $B_{gap}$ is contained.

But it was stipulated that $B_{gap}$ be held fixed so that stored magnetic energy does not drop as poles increase and thereby cancel the torque-enhancing effects higher pole numbers.

A pole number is reached where, with constant copper area, tooth iron width $A_{tooth\ width}$ becomes zero, $B_{gap}=0$, machine torque drops to zero and efficiency drops to zero inasmuch as heat dissipation remains the same.

The other alternative is to keep the ratio ($A_{tooth\ with}/A_{tooth\ face}$) constant as pole number increases in order to maintain constant flux density $B_{gap}$ as shown in Eq. 32. This is equivalent to holding a constant copper/iron ratio. Under this scenario, the copper area is forced to decrease which in turn increases heat generation due to higher coil resistance with an attendant drop in efficiency.

Conflicting demands of copper and iron upon available pole area unavoidably limit the number of poles that can be practically added to a conventional machine without compromising acceptable efficiency. For a given machine shape, at constant gap flux density $B_{gap}$, it can be shown that heat dissipation increases as the square of the pole number.

The following analysis is simplified by modeling on the basis of a single phase per stator. However, it can be shown that the same final result is obtained when all three phases share the same stator as in conventional practice.

Motor efficiency is defined as:

$$E_{ff} = \frac{\text{shaft output power}}{\text{electrical input power}} = \frac{P_S}{(P_S + P_R)} = \frac{1}{\left(1 + \frac{P_R}{P_S}\right)} \qquad \text{Eq. 33}$$

where: $P_R$=resistive losses, i.e. generated heat; and
  $P_S$=shaft output power According to Eq. 33, motor efficiency rises as the ratio $P_S/P_R$ increases. Shaft power $P_S$ varies as a function of angular shaft frequency $\omega_S$:

$$P_S = (\text{Torque})(\text{angular shaft frequency}) = T\omega_S \qquad \text{Eq. 34}$$

where: T=average torque per phase; and
  $\omega_S$=shaft angular frequency

Therefore efficiency is a function of shaft rotational speed (angular shaft frequency) $\omega_S$ which obscures the fundamental effect of heat-to-torque ratio upon efficiency which is constant and independent of speed.

Eliminating the shaft frequency variable $\omega_S$ from $P_S/P_R$ gives the essential "figure of merit" for machine efficiency as:

$$T/P_R = \frac{(\text{torque per phase})}{(\text{resistive loss per phase})} \qquad \text{Eq. 35}$$

From fundamental motor theory (motor shaft power is expressed as:

$$P_S = T\omega_S = \left(\frac{2}{\pi}\right)\omega_E E_{MAG} \quad \text{(shaft power per phase)}$$

where: $\omega_E$=angular electrical frequency; and
  $E_{MAG}$=peak value of the total stored magnetic energy in the machine Let:

$$\frac{\omega_E}{\omega_S} = \frac{N_P}{2} \qquad \text{Eq. 37}$$

where: $N_p$=number of poles
Substituting Eq. 37 into Eq. 36

$$T = \left(\frac{2}{\pi}\right)\frac{\omega_E}{\omega_S}E_{MAG} = \qquad \text{Eq. 38}$$
$$\left(\frac{2}{\pi}\right)\frac{N_P}{2}E_{MAG} = \left(\frac{N_P}{\pi}\right)E_{MAG} = \text{average torque per phase}$$

Assume the magnetic energy contained in the iron core is negligible compared to the rotor-stator gap. Then from basic inductor theory, the magnetic energy $E_{MAG}$ stored in the motor gap is expressed as:

$$E_{MAG} = \frac{v_g B_g^2}{2\mu_o} = \text{peak magnetic energy in the gap} \qquad \text{Eq. 39}$$

where: $v_g$=total volume of the rotor-stator gap;
  $B_g$=peak flux density within the gap; and
  $\mu_o$=magnetic permeability of space
Substituting Eq. 39 into Eq. 36 gives:

$$T = \left(\frac{N_P}{\pi}\right)\frac{v_g B_g^2}{2\mu_o} \qquad \text{Eq. 40}$$

Let total gap volume $v_g$ be defined as:

$$v_g = 2\pi r_g l_g h \qquad \text{Eq. 41}$$

where: $r_g$=gap radius, measured from the rotational axis
  $l_g$=gap radial length; and
  h=rotor/stator axial length.
Substituting Eq. 41 into Eq. 40:

$$T = \left(\frac{N_P}{\pi}\right)\frac{2\pi r_g l_g h B_g^2}{2\mu_0} = \left(\frac{N_P}{\mu_o}\right)r_g l_g h B_g^2 = \text{average torque per phase} \qquad \text{Eq. 42}$$

Note: Eq. 42 represents average torque produced by one phase only. Three phases operating in concert, sharing the same iron core, will produce three times the torque of Eq. 42 so that:

$$T_{3\phi} = 3\left(\frac{N_P}{\mu_o}\right)r_g l_g h B_g^2 = \text{average torque of a 3-phase machine} \qquad \text{Eq. 43}$$

Next, resistive power dissipation $P_R$ per pole per phase will be calculated. Let:

$$P_R = i^2 R_p = \text{electrical power loss of one pole, one phase} \qquad \text{Eq. 44}$$

where: i=current in one equivalent pole coil per phase; and $R_P$=resistance of one equivalent pole coil per phase In terms of overall coil cross-sectional coil area, resistance R can be expressed as:

$$R_P = n^2\left(\frac{\delta 2(h+S)}{k_f A_w}\right) \qquad \text{Eq. 45}$$

where: n=number of turns per pole per phase;
δ=copper coefficient of resistivity;
S=end copper length per pole, one end;
$k_f$=slot copper fill-factor; and
$A_w$=total slot cross-sectional area which houses the equivalent pole coil per phase.

Substituting Eq. 45 into Eq. 44:

$$P_R = (ni)^2\left(\frac{\delta 2(h+S)}{k_f A_w}\right) = \frac{2\delta(ni)^2 S\left(\frac{h}{S}+1\right)}{k_f A_w} \qquad \text{Eq. 46}$$

where: (ni)=amp-turns per pole coil per phase.

Amp-turns (ni) is the magneto-motive force, (mmf,) that drives flux across the rotor-stator air gap, where:

$$(ni) = \frac{l_g B_g}{\mu_o} \qquad \text{Eq. 47}$$

Squaring Eq. 47 and inserting into Eq. 46:

$$P_R = \frac{2\delta S\left(\frac{h}{S}+1\right)l_g^2 B_g^2}{k_f A_w \mu_o^2} = \text{resistive power loss per pole per phase} \qquad \text{Eq. 48}$$

The total resistive loss for all poles $N_P$ and all three phases 3φ is given as:

$$P_{R3\phi} = 3N_P P_R = \frac{6N_P \delta S\left(\frac{h}{S}+1\right)l_g^2 B_g^2}{k_f A_w \mu_o^2} \qquad \text{Eq. 49}$$

Equations 43 and 49 give the total torque and resistive losses of a 3-phase machine of $N_P$ poles. Combining these two equations into Equation 35 yields:

$$\left(\frac{T}{P_R}\right)_{3\phi} = \frac{3\left(\frac{N_P}{\mu_o}\right)r_g l_g h B_g^2 (k_f A_w \mu_o^2)}{6N_P \delta S\left(\frac{h}{S}+1\right)l_g^2 B_g^2} = \qquad \text{Eq. 50}$$

$$\frac{k_f \mu_o r_g h A_w}{2\delta l_g S\left(\frac{h}{S}+1\right)} = \frac{k_f k_g \mu_o h A_w}{2\delta S\left(\frac{h}{S}+1\right)} = \text{torque/heat ratio}$$

where:

$k_g = r_g/l_g$ = gap radius/gap length ratio  Eq. 51

Let pole coil slot cross-sectional area $A_w$ be defined as:

$$A_w = zc \qquad \text{Eq. 52}$$

where, z=slot radial average depth; and
c=slot circumferential average width

Let slot depth be proportional to gap radius, so that:

$$z = k_z r_g \qquad \text{Eq. 53}$$

where: $k_z$=proportionality constant relating radial slot depth to gap radius $r_g$.

Let average slot width (circumferential) c be defined as:

$$c = w\left(\frac{c}{w}\right) = wk_c = \left(\frac{S}{3}\right)k_c \qquad \text{Eq. 54}$$

where, w=S/3=total copper-iron circumferential width for 3-phase machine only  Eq. 55

$k_c$=c/w=proportionality constant indicative of copper-iron ratio  Eq. 56

S=total circumferential span of one pole

Combining Eqs. 53 and 54 into Eq. 52:

$$A_w = \left(\frac{S}{3}\right)k_c k_z r_g \qquad \text{Eq. 57}$$

Substituting Eq. 57 into Eq. 50:

$$\left(\frac{T}{P_R}\right)_{3\phi} = \frac{k_g k_f \mu_o h\left(\frac{S}{3}\right)k_c k_z r_g}{2\delta S\left(\frac{h}{S}+1\right)} = \frac{k_g k_f k_c k_z \mu_o r_g}{6\delta\left(\frac{1}{S}+\frac{1}{h}\right)} = \frac{K(\mu_o/\delta)r_g}{6\left(\frac{1}{S}+\frac{1}{h}\right)} \qquad \text{Eq. 58}$$

where:

$$K = k_g k_f k_c k_z \qquad \text{Eq. 59}$$

Eq. 58 shows there is an optimum value of S and h that gives a maximum value of $(T/P_R)_{3\phi}$. This is found by determining the minimum value of $$\left(\frac{1}{S}+\frac{1}{h}\right),$$

setting its derivative equal to zero and solving for the variable. First let:

$$S = \frac{\text{(gap circumference)}}{\text{(number of poles)}} = \frac{2\pi r_g}{N_P} \qquad \text{Eq. 60}$$

$$h = \frac{V_{OL}}{\pi r_g^2} \text{(approximately, because } r_g \text{ is nearly the outside radius)} \qquad \text{Eq. 61}$$

where: $V_{OL}$=entire motor stack volume (proportional to stack weight).

Combining Eqs. 60 and 61 into $$\left(\frac{1}{S} + \frac{1}{h}\right):$$

$$\left(\frac{1}{S} + \frac{1}{h}\right) = \left(\frac{N_P}{2\pi r_g} + \frac{\pi r_g^2}{V_{OL}}\right) \qquad \text{Eq. 62}$$

Eq. 62 shows there is an optimum value of gap radius $r_g$ for a given pole-number $N_P$ and motor volume $V_{OL}$. But the variable $r_g$ also appears in the numerator of Eq. 58 and must be included in the optimization process. So substituting Eq. 62 into Eq. 58:

$$\left(\frac{T}{P_R}\right)_{3\phi} = \frac{k(\mu_o/\delta)r_g}{6\left(\frac{N_P}{2\pi r_g} + \frac{\pi r_g^2}{V_{OL}}\right)} = \frac{K\left(\frac{\mu_o}{\delta}\right)}{6\left(\frac{N_P}{2\pi r_g^2} + \frac{\pi r_g}{V_{OL}}\right)} \qquad \text{Eq. 63}$$

According to Eq. 63 there is an optimum value of gap radius $r_g$ for a machine of constant poles $N_p$ and constant volume (weight) $V_{OL}$ that gives a minimum value of $$\left(\frac{1}{S} + \frac{1}{h}\right)$$

which is found by setting its derivative equal to zero:

$$\frac{d}{dr_g}\left(\frac{1}{Sr_g} + \frac{1}{hr_g}\right) = \frac{d}{dr_g}\left(\frac{N_P}{2\pi r_g^2} + \frac{\pi r_g}{V_{OL}}\right) = \left(\frac{-2N_P}{2\pi r_g^3} + \frac{\pi}{V_{OL}}\right) = 0 \qquad \text{Eq. 64}$$

Solving Eq. 63 for $r_{g\ OPT}^3$:

$$\frac{\pi}{V_{OL}} = \frac{N_P}{\pi r_{gOPT}^3}$$

$$r_{gOPT}^3 = \frac{N_P V_{OL}}{\pi^2} \qquad \text{Eq. 65}$$

or:

$$N_P = \frac{\pi^2 r_{gOPT}^3}{V_{OL}} \qquad \text{Eq. 66}$$

From Eqs. 60 and 61:

$$N_P = \frac{2\pi r_g}{S_{OPT}} \qquad \text{Eq. 67}$$

$$V_{OL} = h\pi r_g^2 \qquad \text{Eq. 68}$$

Substituting Eqs. 67 and 68 into Eq. 66:

$$\frac{2\pi r_g}{S_{OPT}} = \frac{\pi^2 r_g^3}{h\pi r_g^2}$$

$$S_{OPT} = 2h \text{ or } h_{OPT} = \frac{S}{2} \qquad \text{Eq. 69}$$

Thus, according to Eq. 69, the optimum end-copper arc length $S_{OPT}$ has a fixed proportional relationship to axial length h. Notice that end-copper length $S_{OPT}$ is equal to twice the slot length h. Thus, even though end-copper comprises ⅔ the total conductor length, this particular rectangular pole face geometry nevertheless allows minimum resistance per unit of flux. Therefore $S_{OPT}=2h$ is the basic criteria that must be observed to achieve maximum efficiency regardless of overall motor shape, i.e., maximum efficiency independent of form-factor or "aspect ratio".

Stated differently, any motor shape is possible so long as the design criteria stipulated by Eq. 69 is observed. End copper length $S_{OPT}$ is indicative of the number of poles required under optimized conditions. Motor shape, in fact, determines the number of poles when optimizing the design according to Eq. 69 because the number of poles determines end-copper length $S_{OPT}$. In other words, even though the ratio $S_{OPT}=2h$ must hold for any shape, the number of poles required to satisfy $S_{OPT}=2h$ varies according to shape. Shape, then, determines the necessary pole number that produces the relationship $S_{OPT}=2h$.

The paramount conclusion derived from Eqs. 65 and 69 is that an optimized machine tends toward a flat form-factor, or "pancake" shape, as the number of poles increases. This is further emphasized by substituting Eq. 68 into Eq. 66:

$$(N_P) = \frac{\pi'_{OPT}}{h} = \pi\left(\frac{r_{gOPT}}{h}\right) \qquad \text{Eq. 70}$$

or:

$$\left(\frac{r_g}{h}\right)_{OPT} = \frac{N_P}{\pi} \qquad \text{Eq. 71}$$

Clearly, from Eq. 71, the aspect ratio ($r_g/h$) is the governed by pole number $N_P$.

Eq. 71 can also be rewritten as:

$$r_{gOPT} = \left(\frac{N_P}{\pi}\right)h \qquad \text{Eq. 72}$$

or:

-continued $$h = \left(\frac{\pi}{N_P}\right) r_{gOPT} \qquad \text{Eq. 73}$$

Returning now to evaluating peak efficiency, which occurs when:

$$\left(\frac{1}{S} + \frac{1}{h}\right) \rightarrow \left(\frac{1}{S} + \frac{1}{h}\right)_{OPT} \qquad \text{Eq. 74}$$

Substituting Eq. 69 into Eq. 73:

$$\left(\frac{1}{S_{OPT}} + \frac{1}{h}\right)_{OPT} = \left(\frac{1}{S_{OPT}} + \frac{2}{S_{OPT}}\right)_{OPT} = \frac{3}{S_{OPT}} = \left(\frac{3}{2h}\right) \qquad \text{Eq. 75}$$

It is now possible to finish the optimization process by rewriting Eq. 58 as:

$$\left(\frac{T}{P_R}\right)_{3\phi OPT} = \frac{K(\mu_o/\delta) r_{gOPT}}{6\left(\frac{1}{S_{OPT}} + \frac{1}{h}\right)_{OPT}} \qquad \text{Eq. 76}$$

Substituting Eqs. 69 and 75 into Eq. 76 and dropping most of the "$_{OPT}$" subscripts:

$$\left(\frac{T}{P_R}\right)_{3\phi OPT} = \frac{K}{18}\left(\frac{\mu_o}{\delta}\right) r_g S = \frac{K}{9}\left(\frac{\mu_o}{\delta}\right) r_g h \qquad \text{Eq. 77}$$

Substituting Eq. 73 into Eq. 77:

$$\left(\frac{T}{P_R}\right)_{3\phi OPT} = \frac{K}{9}\left(\frac{\mu_o}{\delta}\right)\left(\frac{\pi}{N_P}\right) r_g^2 \qquad \text{Eq. 78}$$

Solving Eq. 67 for $r_g^2$:

$$r_g^2 = (r_g^3)^{2/3} = \left(\frac{N_P V_{OL}}{\pi^2}\right)^{2/3} \qquad \text{Eq. 79}$$

Substituting Eq. 79 into Eq. 78:

$$\left(\frac{T}{P_R}\right)_{3\phi OPT} = \frac{K}{9}\left(\frac{\mu_o}{\delta}\right)\left(\frac{\pi}{N_P}\right)\left(\frac{N_P V_{OL}}{\pi^2}\right)^{2/3} = \frac{K}{9}\left(\frac{\mu_o}{\delta}\right)\left(\frac{\pi^3 N_P^2 V_{OL}^2}{N_P^3 \pi^4}\right)^{1/3}$$

$$\left(\frac{T}{P_R}\right)_{3\phi OPT} = \frac{K}{9}\left(\frac{\mu_o}{\delta}\right)\left(\frac{V_{OL}^2}{\pi N_P}\right)^{1/3} = \frac{K}{9\pi^{1/3}}\left(\frac{\mu_o}{\delta}\right)\left(\frac{V_{OL}^2}{N_P}\right)^{1/3} \qquad \text{Eq. 80}$$

For a machine of fixed volume $V_{OL}$, efficiency must unavoidably drop as the number of poles $N_P$ increases. Eq. 80 shows that the only way to maintain efficiency with increasing pole-number is to simultaneously increase volume in the proportion of $V_{OL} \equiv N_P^{1/2}$. As an example, if the number of poles increases by a factor of 9 times, then volume $V_{OL}$ must increase $\sqrt{9} = 3$ times.

According to Eq. 80, at fixed machine volume $V_{OL}$, the efficiency factor $(T/P_R)_{3\phi OPT}$ drops relatively slowly with increasing poles. For instance, if the number of poles $N_P$ and resulting torque T increases by 8 times, then $(T/P_R)_{3\phi OPT}$ decreases by only a factor of $8^{1/3} = 2$.

By comparison with gap enlargement techniques for torque gain, this reduction of $(T/P_R)_{3\phi OPT}$ is 4 times less than resulting from an increased gap at constant pole-number where $(T/P_R)_{3\phi OPT}$ would decrease by a factor of 8 times.

Thus torque enhancement by means of pole-number increase is significantly more efficient than achieving similar enhancement by means of gap $l_g$ enlargement alone at constant machine volume $V_{OL}$.

Reviewing Eq. 77 will confirm the conclusion reached from Eq. 80:

$$\left(\frac{T}{P_R}\right)_{3\phi OPT} = \frac{K}{9}\left(\frac{\mu_o}{\delta}\right) r_g h \qquad \text{Eq. 81}$$

It is evident from Eq. 81 that the only way efficiency can remain constant independent of changing machine shape or size is to hold the product $r_g h$ constant. Yet, for example, a doubling of radius $r_g$ while halving length h in order to hold $r_g h$ constant will result in a 2-fold increase of machine volume $V_{OL}$ because:

$$V_{OL} = h \pi r_g^2 = \pi r_g (r_g h) = r_g (\text{const.}) \qquad \text{Eq. 82}$$

Another way to evaluate this situation is to replace $$h = \left(\frac{V_{OL}}{\pi r_g^2}\right)$$

in the term $r_g h$:

$$r_g h = r_g \frac{V_{OL}}{\pi r_g^2} = \frac{V_{OL}}{\pi r_g} \qquad \text{Eq. 83}$$

Which shows that at constant volume $V_{OL}$, the product $r_g h$ drops as radius $r_g$ increases.

Alternatively, poles $N_P$ and resulting torque can be increased at constant $r_g$ by decreasing axial length h according to Eq. 70, but this also results in a decrease of the product $r_g h$ and a resulting drop in $(T/P_R)_{3\phi OPT}$ with a corresponding reduction in machine efficiency as torque increases.

The most comprehensive expression of $(T/P_R)_{3\phi OPT}$ is found by substituting Eq. 83 into Eq. 82:

$$\left(\frac{T}{P_R}\right)_{3\phi OPT} = \frac{K}{9\pi}\left(\frac{\mu_o}{\delta}\right)\frac{V_{OL}}{r_g} \qquad \text{Eq. 84}$$

The inescapable conclusion of Eqs. 80 and 84 is that, for constant machine volume $V_{OL}$, it is impossible to increase torque without some slight compromise of efficiency. However, the loss of efficiency accompanying torque increase is much less when employing multiple poles as compared to the alternative of gap enlargement.

As previously discussed, gap enlargement also increases the torque available. Machine torque, is a function of gap volume $V_g$, flux density $B_g$, and the angular rate of change of flux density $dB_g/d\theta_S$. Machine torque T can be derived as simply:

$$T = \frac{1}{2\pi} N_P \Delta E_M \qquad \text{Eq. 85}$$

The number of poles $N_P$ in Eq. 85 determines the number of flux reversals, or torque cycles, per shaft rotation. Each flux reversal supplies a quantity of magnetic energy $\Delta E_M$ that is converted into an equivalent quantity of mechanical shaft energy $\Delta E_S$. Obviously, an increase in the number of poles will result in an increase in the time rate-of-change of magnetic energy converted to mechanical energy per shaft rotation. Thus:

$$T = \frac{\text{total magnetic energy per unit time}}{\text{per shaft revolution}} = \qquad \text{Eq. 86}$$

$$\frac{(N_P \Delta E_M)/\Delta t}{\Delta \theta_S} = \frac{P_S}{\Delta \theta_S} = \frac{T \Delta \theta_S}{\Delta \theta_S} = T$$

According to Eq. 85, at the most fundamental level, torque production is a function of just two variables: gap magnetic energy $\Delta E_M$ and the number of poles $N_P$.

As previously discussed above, no motor can have fewer than two poles. Therefore a minimum pole number $N_P$ is inherent to any fashion of motor construction. While pole number $N_P$ determines the frequency of magnetic energy conversion at a given shaft speed, it is the magnetic energy $\Delta E_M$ itself, stored within the gap volume $V_g$, that is an important criterion for torque production. Gap volume $V_g$ is the chief physical means of storing magnetic energy $\Delta E_M$ and thereby facilitating production of mechanical energy $\Delta E_S$.

The perfect motor would have a core material possessing infinite permeability ($\mu_{core} \to \infty$) and zero core reluctance ($R \to 0$). In this ideal scenario the total motor reluctance R would exist solely in the gap. Consequently, if there were no gap, magnetic circuit reluctance R would be zero and the presumably "ideal" machine would produce zero torque.

Fortunately, the necessity for mechanical running clearance between rotor and stator has inadvertently provided adequate reluctance R and the requisite magnetic energy storage capacity. Manufacturing tolerances for rotor-stator running clearance has permitted acceptable performance despite the prevailing wisdom of reducing the gap and corresponding reluctance R.

A smaller gap does, however, have the advantage of improving motor efficiency. There is a tradeoff between efficiency and torque; one comes at the expense of the other, as will be discussed later.

Dependency of torque T upon variable motor inductance dL is calculated by:

$$T = \frac{1}{2} i^2 \frac{dL}{d\theta_S} \qquad \text{Eq. 87}$$

Accurate modeling of any type of electromotive machine must inevitably be that of a "variable inductor" where variable inductance dL arises strictly from rotor rotation.

Based on the two basic definitions of inductance (variable inductance dL takes the form:

$$dL = \left(\frac{n}{i}\right) d\phi \quad \text{(smooth bore AC motors)} \qquad \text{Eq. 88}$$

or:

$$dL = \left(\frac{n^2}{R^2}\right) dR \quad \text{(salient pole reluctance motor)} \qquad \text{Eq. 89}$$

Eq. 88 relates to standard smooth-bore AC motors where reluctance R is constant and flux variation $d\phi$ arises from rotor rotation even at constant current i. Eq. 89 pertains to reluctance motors where the necessary flux variation $d\phi$ arises from variable reluctance dR, also an effect of rotor rotation.

Equations 87, 88 and 89 confirm that every type of motor is essentially a "rotary inductor", a concept contrary to conventional motor modeling.

Typical textbook modeling of the commonplace AC induction motor is that of a transformer, a convenient explanation of rotor excitation due to slip. However, the transformer model fails to recognize the underlying principle of motor theory as requiring magnetic energy storage, a property which only an inductor can provide. A transformer, on the other hand, stores very little magnetic energy. In the extreme, an ideal transformer of infinite core permeability ($\mu_{core} \to \infty$) holds zero magnetic energy and therefore could never function as a torque-producing machine. An AC induction motor, while sometimes described as a "rotary transformer" to assist analyzing rotor excitation, must properly be modeled as a "rotary inductor" to correctly portray the theoretical basis of its operation.

Substituting Eqs. 88 and 89 into Eq. 87:

$$T = \frac{1}{2}(ni)\frac{d\phi}{d\theta_S} = \frac{1}{2} R \phi \frac{d\phi}{d\theta_S} \quad \text{(smooth bore AC motors)} \qquad \text{Eq. 90}$$

$$T = \frac{1}{2}\frac{(ni)^2}{R^2}\frac{dR}{d\theta_S} = \frac{1}{2}\phi^2 \frac{dR}{d\theta_S} \quad \text{(salient pole reluctance motor)} \qquad \text{Eq. 91}$$

Notice that reluctance R plays an integral role in torque production for both types of machines which together covers the total spectrum of known electromotive machines including the brush-type DC motor.

Ironically, the "brush-type DC motor" would fall under the category of Eq. 90 rather than Eq. 91 because reluctance R is constant inside the region of torque production notwithstanding its obvious salient poles.

The so-called "brushless DC motor" is actually an inverter-controlled, permanent magnet rotor, AC synchronous motor which classifies it under Eq. 90 as well. The permeability of permanent magnet material is so low as to create a large effective rotor-stator gap from a magnetic standpoint, even if the physical gap is quite small. In fact, permanent magnets themselves represent storage of an enormous amount of magnetic energy introduced during their manufacture. Change of flux $d\phi$ as seen by the stator with respect to rotor shaft angle, $d\phi/d\theta_S$, dictated by Eq. 90, in a brushless DC motor is due to rotor rotation because the magnitude of permanent magnet flux $\phi$ remains nearly constant during operation.

As discussed above, the foundation of torque production is the conversion of a quantity of magnetic energy $dE_M$ into an equivalent quantity of mechanical energy $dE_S$. The changing magnitude of magnetic energy $dE_M$ is due to a changing level of flux $d\phi$ because magnetic energy is contained within the flux. Thus magnetic energy can change only with a corresponding change in flux. And the change in flux $d\phi$ must be mechanically dependent, not current i dependent, in order for mechanical energy to be extracted:

$$T = \frac{dE_S}{d\theta_S} = \frac{dE_M}{d\theta_S} = \mathbb{R}\phi \frac{d\phi}{d\theta_S} \qquad \text{Eq. 92}$$

The term $d\phi/d\theta_S$ in Eq. 92 represents the critical "mechanically-dependent change in flux $d\phi$" that is required to convert magnetic energy into mechanical energy.

As shown by Eq 92, the absolute minimum constituents for torque production in any type of motor, smooth bore or salient pole, is reluctance R, magnetic flux $\phi$, and a mechanical means for varying the flux to give $d\phi/d\theta_S$. These vital elements together constitute a change in magnetic energy that inexorably accompanies a change in mechanical energy. Even in a reluctance motor, the net effect of mechanically-variable machine reluctance is to create variable flux $d\phi$ as required by Eq. 92.

Magnetic energy $\Delta E_M$ associated with mechanical energy $\Delta E_S$, is known as "co-energy" because it is co-created during production of shaft energy by the intermediate magnetic field which links electrical input power to mechanical output power. Co-energy functions as the conversion agency, always co-existing with mechanical energy. Co-energy and mechanical energy are both of equal energy content.

Co-energy is an inescapable by-product of the electro-mechanical conversion process and must be removed from the armature coil during or after each torque cycle (half of an electrical cycle). This is easily accomplished in poly-phase machines with two or more phases because co-energy is simply transferred successively from phase coil to phase coil. Consequently, co-energy never leaves the motor but always remains in the gap while shifting from phase to phase. A true single-phase machine is difficult to implement practically due to the complexity of extracting co-energy at the end of each torque cycle. So-called single-phase machines, in fact, assimilate poly-phase concepts (counter-rotating fields) in their operation.

Reactive energy is created only by variable current di acting upon fixed inductance L which creates a self-induced voltage 90° out-of-phase with current i. Thus reactive energy is not directly related to real energy, i.e., it has no effect upon torque production. Varying current di produces a self-induced, or "inductive" voltage, $V_{self\ induced} = L(di/dt)$ Inductive voltage is not to be confused with machine-generated voltage $V_{back\ emf} = i(dL/dt)$ which is termed "back emf" (electromotive force). Back emf arises from variable inductance dL as the result of rotor rotation even at constant current i. This voltage is always exactly in-phase with current i and therefore accounts for real power production of the machine. Real energy developed by back emf is expressed as mechanical energy output and as co-energy transferred from phase to phase.

Unlike real co-energy, reactive energy automatically enters and leaves the motor "inductor" without special provisions. Also unlike co-energy, the magnitude of reactive energy bears no particular relationship to mechanical energy. Reactive energy is equal to co-energy, and therefore mechanical energy, only when both rotor and stator fields are of equal flux density, an ideal operating condition for realizing maximum efficiency.

Increasing the rotor-stator air gap, while creating a favorable condition for torque production, comes with an efficiency penalty due to higher electrical losses in driving flux through a greater reluctance R. In other words, while reluctance R is essential for torque production, reluctance also incurs energy dissipation that ultimately restricts practical torque production. A tradeoff is reached balancing the advantage of high torque against the drawback of reduced efficiency.

Large values of reluctance R for high torque production, as indicated by Eq. 92, may be satisfied in ways other than an enlarged rotor-stator air gap. Reluctance R may be increased by simply operating the motor in a state of partial "core saturation", a condition where iron permeability $\mu_{core}$ of the core begins to drop off substantially.

Magnetic saturation refers to the limited capacity of ferromagnetic material to hold magnetic flux. In the analogy of a sponge absorbing a finite quantity of water, iron is also restricted as to how much flux it can contain. A point of flux concentration is reached where no further increase in total coil current (ni) can raise core flux density $B_{core}$ above the saturation limit. This operational threshold is known as "core saturation". Motors are traditionally intended to operate up to this saturation limit but not above it.

Figure 7:
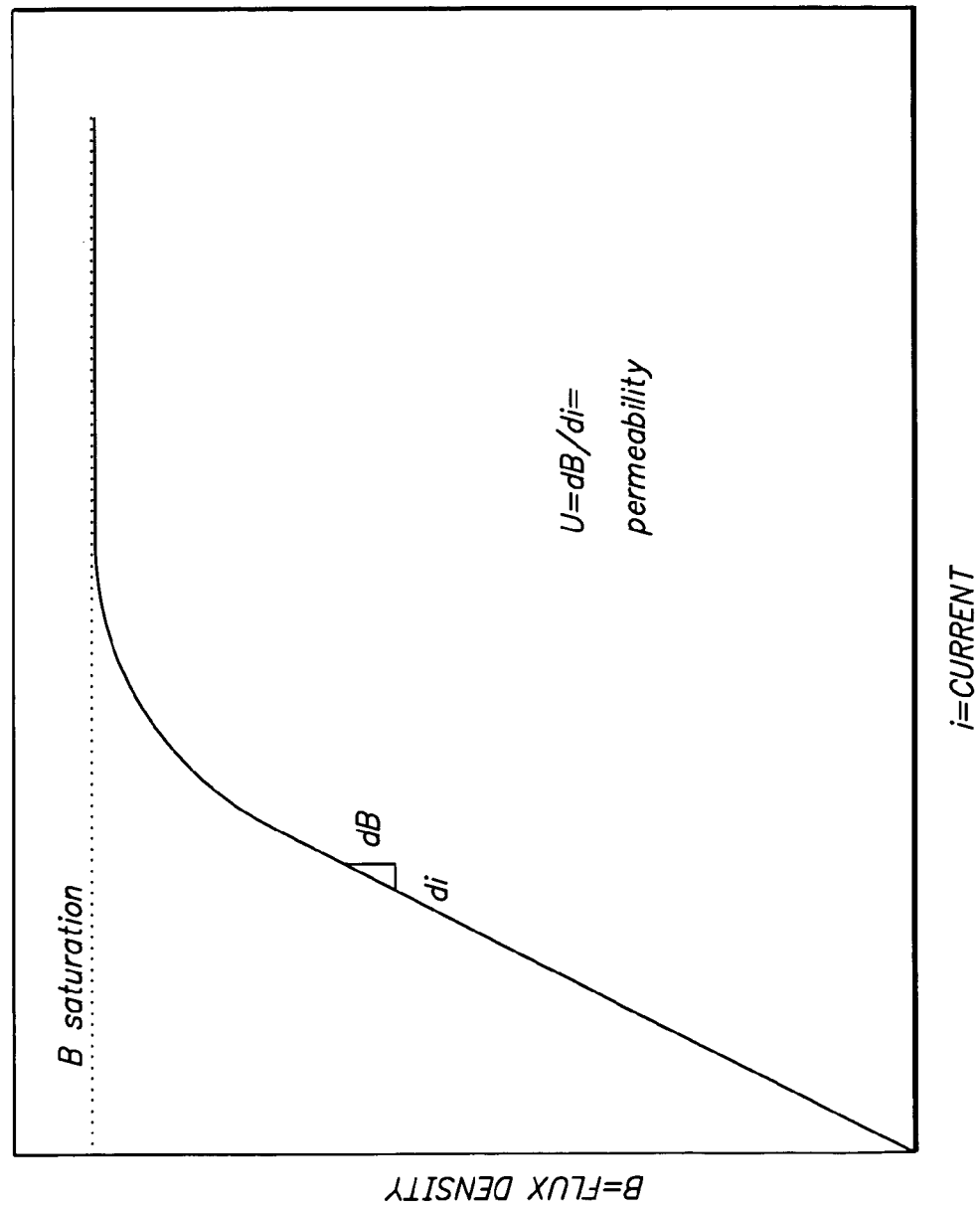
FIG. 7 is a graph showing the iron permeability for the motor illustrated in FIG. 1.

FIG. 7 is a simplified representation of iron core permeability $\mu_{core}$ which is the curve formed by plotting flux density B against magnetizing current i. The slope of this curve is termed magnetic "permeability" $\mu_{core}$, which stated mathematically is:

$$\mu_{core} = \frac{dB_{core}}{di} \qquad \text{Eq. 93}$$

The curve as depicted in FIG. 7 is clearly non-linear. There is region of changing permeability $\mu_{core}$ approaching saturation where the value of $\mu_{core}$ is decreasing with increasing magnetizing current i. Operating the motor within this transition region of controllable core permeability $\mu_{core}$, as a function of current i, provides a simple means of varying overall motor reluctance $R_T$ by controlling the magnetizing current i.

Reluctance, R pertains only to reluctance created by the gap where core reluctance $R_{core}$ is considered negligible by comparison in order to simplify the mathematical treatment. However, with the approach of core saturation, total circuit reluctance $R_T$ rises with decreasing core permeability $\mu_{core}$ having the net effect of magnetically increasing the gap.

Total circuit reluctance $R_T$ is simply the sum of iron core reluctance $R_{core}$ and gap reluctance R:

$$\mathbb{R}_T = \left(\frac{l_{core}}{A\mu_{core}} + \frac{l_{gap}}{A\mu_{gap}}\right) = \frac{l_{core}}{A}\left(\frac{1}{\mu_{core}} + \frac{k_l}{\mu_o}\right) \qquad \text{Eq. 94}$$

where: $k_l$=ratio of gap length to core length, a ratio that is usually independent of machine size According to Eq. 94, as the value of core permeability $\mu_{core}$ falls to lower values near saturation, the term $1/\mu_{core}$ increases to become a significant portion of overall circuit reluctance $R_T$. Under conditions approaching saturation, Eq. 92 may be rewritten as:

$$T_{near\ saturation} = \mathbb{R}_T \phi \frac{d\phi}{d\theta_S} \qquad \text{Eq. 95}$$

Maximum motor torque T becomes variable near saturation in as much as it is a function of variable reluctance total circuit reluctance $R_T$. $R_T$, in turn, is a function of variable core permeability $\mu_{core}$ (Eqs. 93 and 94) wherein $\mu_{core}$ varies as a function of current i, as indicated by the permeability curve of FIG. 7. Therefore peak motor torque T, as given by Eq. 95, is ultimately a function of the core magnetizing current i.

A motor with a standard rotor-stator air gap achieves the energy storage properties attributable to an enlarged air gap by merely operating at partial saturation during occasions when high torque is demanded. Driving the motor into partial saturation, beyond that allowed by conventional practice, offers a simple and controllable method for raising circuit reluctance $R_T$ and thus energy storage capacity of the motor, albeit incurring a slightly reduced efficiency as discussed above. Under partial-load, a small standard air gap allows higher operating efficiencies. Under high torque load, driving the motor into partial saturation extends the range of torque production by a factor of 2 to 3 times the standard rating.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

The invention claimed is:

1. An electric motor comprising:
   a rotor;
   a stator having an axial length;
   a plurality of teeth disposed on the stator;
   a gap disposed between the rotor and the stator; and
   a plurality of copper windings disposed around each of the stator teeth, each of the windings having a length of end copper equal to about twice the axial length of the stator in order to be able to increase a number of poles of the motor without decreasing efficiency.

2. The electric motor of claim 1 wherein the stator has a flat form factor from the length of the end copper.

3. The electric motor of claim 2 wherein the stator is generally circular with a diameter greater than the axial length of the stator.

4. The electric motor of claim 1 wherein the plurality of copper windings are configured for three phases.

5. The electric motor of claim 4 wherein the plurality of stator teeth comprise thirty-six stator teeth.

6. The electric motor of claim 1 wherein the plurality of windings define a plurality of poles.

7. The electric motor of claim 6 wherein the plurality of windings define twelve poles.

8. The electric motor of claim 1 wherein the gap between the stator and rotor is configured to increase magnetic reluctance and increase motor torque.

9. The electric motor of claim 1 wherein the stator and rotor are configured to be operated while in partial saturation in order to increase motor torque.

10. An electric motor comprising:
    a rotor with a plurality of teeth;
    a stator with a plurality of teeth, the stator being sized and configured to surround the rotor;
    a plurality of copper windings disposed around each of the stator teeth; and
    a gap disposed between the teeth of the rotor and the teeth of the stator, the gap being sized and configured to increase magnetic reluctance thereby increasing magnetic energy storage in the electric motor which enables an increase in motor torque without incurring core saturation.

11. The electric motor of claim 10 wherein the stator has an axial length and each of the windings has a length of end copper equal to about twice the axial length of the stator in order to be able to increase a number of poles of the motor without decreasing efficiency.

12. The electric motor of claim 10 wherein the motor is operated in partial saturation in order to increase torque.

13. An electric motor comprising:
    a rotor having a plurality of rotor teeth and a shaft for producing torque;
    a stator having a plurality of stator teeth, the stator being configured to circumferentially surround the rotor;
    a gap defined between the rotor teeth and the stator teeth; and
    a wire coil disposed around a respective one of the stator teeth, the wire coil configured such that a length of the end copper for the coil is greater than a width of the stator.

14. The motor of claim 13 wherein the length of the end copper is about two times greater than the width of the stator.

15. The motor of claim 14 wherein the wire coil is configured for three-phase power.

16. The motor of claim 15 wherein the wire coil is wrapped around the stator teeth to develop a plurality of poles.

17. The motor of claim 16 wherein the wire coil is wrapped around the stator teeth to develop twelve poles.

18. The motor of claim 17 wherein the plurality of stator teeth are thirty-six stator teeth and the plurality of rotor teeth are thirty-six rotor teeth.

19. The motor of claim 18 wherein the thirty-six stator teeth define thirty-six stator slots and each pole of the motor occupies two slots.

20. The motor of claim 13 wherein the motor is operated in partial saturation in order to increase torque.

21. The motor of claim 13 wherein the gap is sized and configured to increase magnetic reluctance and increase motor torque.

22. The electric motor of claim 10, wherein the gap is substantially uniform between an outer circumference of the rotor and an inner circumference of the stator.

* * * * *